United States Patent
Koerber et al.

(10) Patent No.: US 6,823,755 B2
(45) Date of Patent: Nov. 30, 2004

(54) MANUAL TRANSMISSION

(75) Inventors: Martin Koerber, Neufahrn (DE); Heinz Bassner, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/265,615

(22) Filed: Oct. 8, 2002

(65) Prior Publication Data

US 2003/0066368 A1 Apr. 10, 2003

(30) Foreign Application Priority Data

Oct. 10, 2001 (DE) .......................................... 101 50 054

(51) Int. Cl.$^7$ ................................................ F16H 63/00
(52) U.S. Cl. ..................... 74/335; 74/473.21; 74/473.37
(58) Field of Search ............................ 74/335, 473.36, 74/473.37, 473.21, 473.12, 473.11

(56) References Cited

U.S. PATENT DOCUMENTS

| 1,928,782 | A |   | 10/1933 | Church |
| 2,893,256 | A |   | 7/1959 | Wargo |
| 3,495,473 | A |   | 2/1970 | Willis |
| 4,449,416 | A |   | 5/1984 | Huitema |
| 4,539,447 | A | * | 9/1985 | Mizutani et al. ......... 200/61.91 |
| 4,621,536 | A |   | 11/1986 | Takeuchi |
| 4,709,793 | A | * | 12/1987 | Sakakibara et al. ...... 192/219.4 |
| 5,205,179 | A | * | 4/1993 | Schneider .................... 74/365 |
| 5,806,368 | A | * | 9/1998 | Petri ........................... 74/335 |
| 5,868,644 | A | * | 2/1999 | Beim ........................ 475/271 |
| 6,318,206 | B1 | * | 11/2001 | Kramer et al. ........... 74/473.37 |
| 6,363,806 | B1 | * | 4/2002 | Kim ............................ 74/335 |
| 6,374,690 | B1 | * | 4/2002 | Koyama et al. ........... 74/473.1 |
| 6,374,692 | B1 | * | 4/2002 | Steinberger et al. ..... 74/473.37 |
| 6,389,919 | B1 | * | 5/2002 | Hennequet et al. ...... 74/473.37 |
| 6,397,698 | B1 | * | 6/2002 | Kamiya et al. .......... 74/473.11 |
| 6,497,160 | B2 | * | 12/2002 | Meyer et al. ................. 74/335 |

FOREIGN PATENT DOCUMENTS

| DE | 4335754 | 4/1995 |
| DE | 19524116 | 7/1999 |
| DE | 19920064 | 4/2001 |
| DE | 102 35 404 | 2/2004 |
| JP | 61160652 | 7/1986 |

* cited by examiner

Primary Examiner—Rodney H. Bonck
Assistant Examiner—David D. Le
(74) Attorney, Agent, or Firm—Crowell & Moring LLP

(57) ABSTRACT

A manual transmission includes a shift body that is associated with two separate actuating devices, wherein the shift body may be a gearshift fork or a gearshift rocker. The gearshift body can be actuated selectively by one or the other actuating device. The actuating devices are preferably gearshift rods.

22 Claims, 3 Drawing Sheets

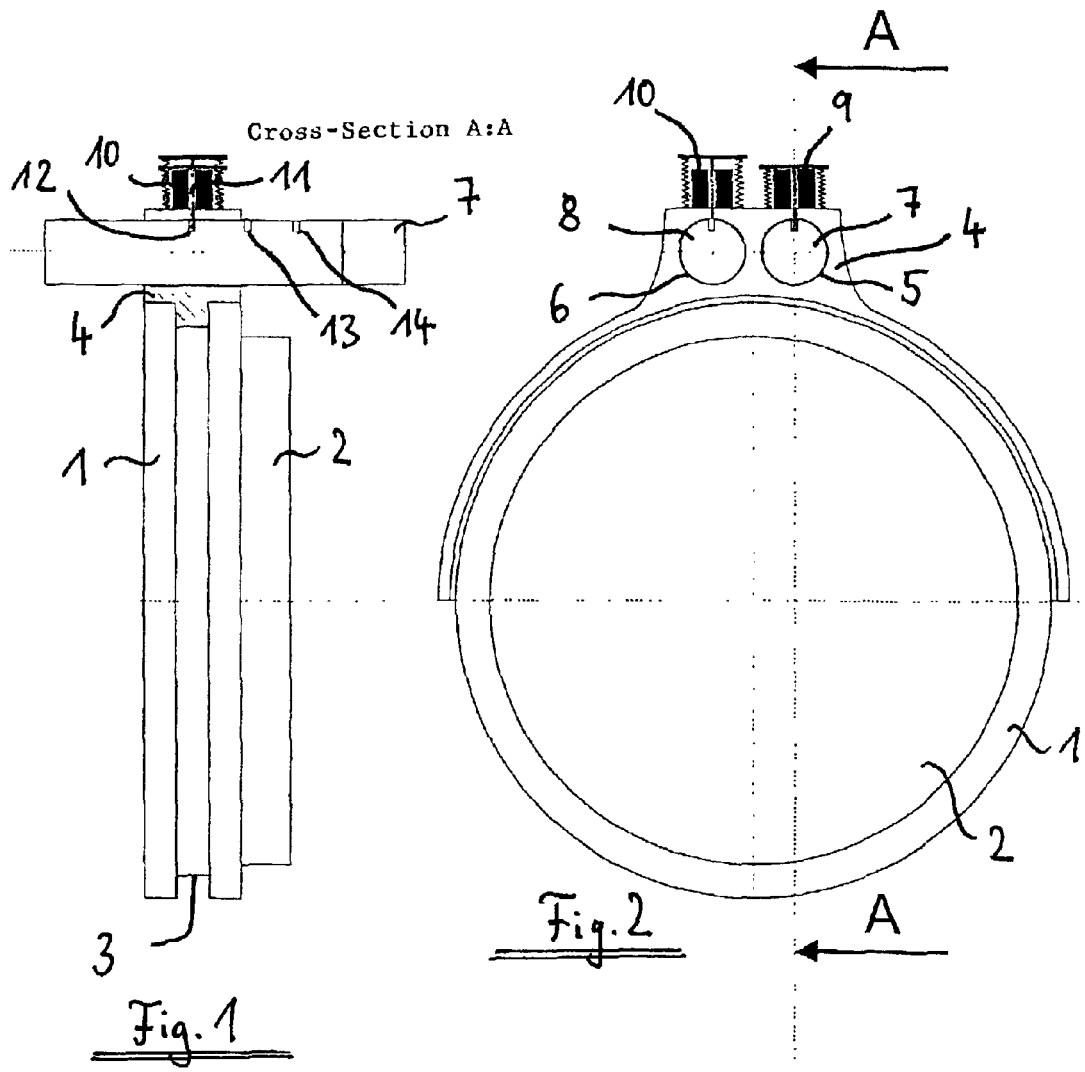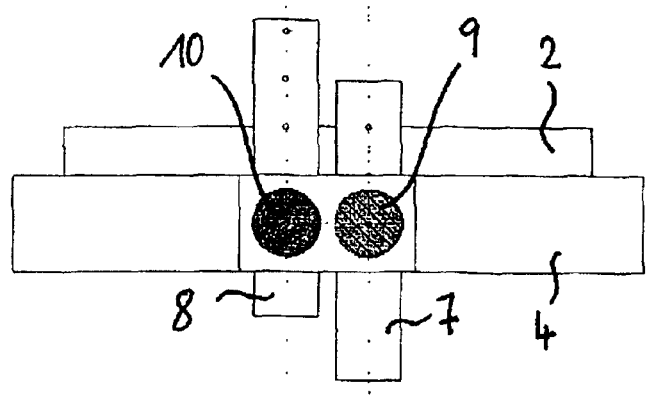

MANUAL TRANSMISSION

This application claims the priority of German Patent Document No. 101 50 054.8, filed Oct. 10, 2001, the disclosure of which is expressly incorporated by reference herein.

BACKGROUND AND SUMMARY OF THE INVENTION

The present invention relates to a manual transmission.

DE 199 20 064 C2 discloses a gear wheel variable speed transmission for motor vehicles. Two pairs of gear wheels, which can be coupled in a known manner with the input shaft by way of a sliding sleeve and an assigned stationary wheel, can be rotated on an input shaft. These gear wheels, which are mounted so as to rotate on the input shaft, are in permanent engagement with assigned gear wheels, which are connected stationarily to an output shaft. A single gearshift rod is used to shift the two sliding sleeves. On the gearshift rod there are two gearshift forks, which can be displaced in relation to said gearshift rod. The gearshift forks are assigned to the two sliding sleeves and can be coupled selectively to the gearshift rod by way of electromagnetic actuators. By actuating one of the two actuators, a pin, assigned to the gearshift fork, slides into a recess of the gearshift rod and produces a shape-locking connection between the gearshift fork and the gearshift rod. When the gearshift rod is slid axially, the respective gearshift fork and the assigned sliding sleeve are also moved along with the gearshift rod. Thus, the electromagnetic actuators form an "internal gearshift mechanism" of the transmission.

In such a transmission all of the gearshift bodies, that is all of the gearshift forks and gearshift rockers, are assigned to a single gearshift rod. Thus, it is not possible to move several gearshift elements simultaneously in different shift directions.

An object of the invention is to provide a manual transmission with expanded "degrees of gearshift freedom".

One of the aspects of the invention is directed to a manual transmission, in which two separate actuating devices are assigned to the individual gearshift bodies, that is the gearshift forks and/or the gearshift rockers. A gearshift body can be actuated selectively by one or the other actuating device. The actuating devices are preferably gearshift rods.

The gearshift rods run in essence parallelly side-by-side through recesses of the gearshift bodies. Each individual gearshift body has two actuators, which can be actuated, for example, electromagnetically or mechanically and are assigned to the two gearshift rods. By actuating the actuators, a coupling between the gear shift rod and the gearshift body can be produced.

One important advantage of the invention over the aforementioned prior art is that two coaxially arranged gearshift bodies can be shifted simultaneously, especially in different shift directions.

The gearshift elements can be coupled with the gearshift rods by the electromagnetic actuators. That is, in the uncoupled state the gearshift rods can slide relative to the gearshift bodies. A further development of the invention provides that the gearshift bodies can be coupled with a gearshift rod not only in a specific position but also that there are several "sliding positions" of the gearshift rod, in which it is possible to couple the gearshift rod with the gearshift body. To this end, the gearshift rod can have several recesses, in which an assigned actuator of the gearshift body can engage. Preferably the number of recesses of the gearshift rod in the area of one actuator is equivalent to the number of shift positions of the assigned gearshift body. A gearshift fork and/or a gearshift rocker has usually one neutral position and two shift positions. In this case the gearshift rod has three recesses in the area of the gearshift body.

Preferably the gearshift rods can be actuated independently of one another. However, it can also be provided that the gearshift rods can be actuated simultaneously, but preferably only in different "sliding directions".

According to a further development of the invention, the gearshift rods can be coupled together by a mechanical coupling element. Owing to the mechanical coupling of two gearshift rods, they can be actuated oppositely directed by a single setting element, for example, a single hydraulic cylinder or an electric control motor. The coupling element can be, for example, a rocker lever, disposed in the transmission, or a gear wheel, which meshes with gear rack segments of both gearshift rods.

Other objects, advantages and novel features of the present invention will become apparent from the following detailed description of the invention when considered in conjunction with the accompanying drawings.

BRIEF DESCRIPTION OF THE DRAWINGS

FIG. 1 is a side view of a detail of a transmission in the area of the gearshift fork.

FIG. 2 is a view in the axial direction of FIG. 1.

FIG. 3 is a top view of FIGS. 1 and/or 2.

DETAILED DESCRIPTION OF THE DRAWINGS

Figure 4:
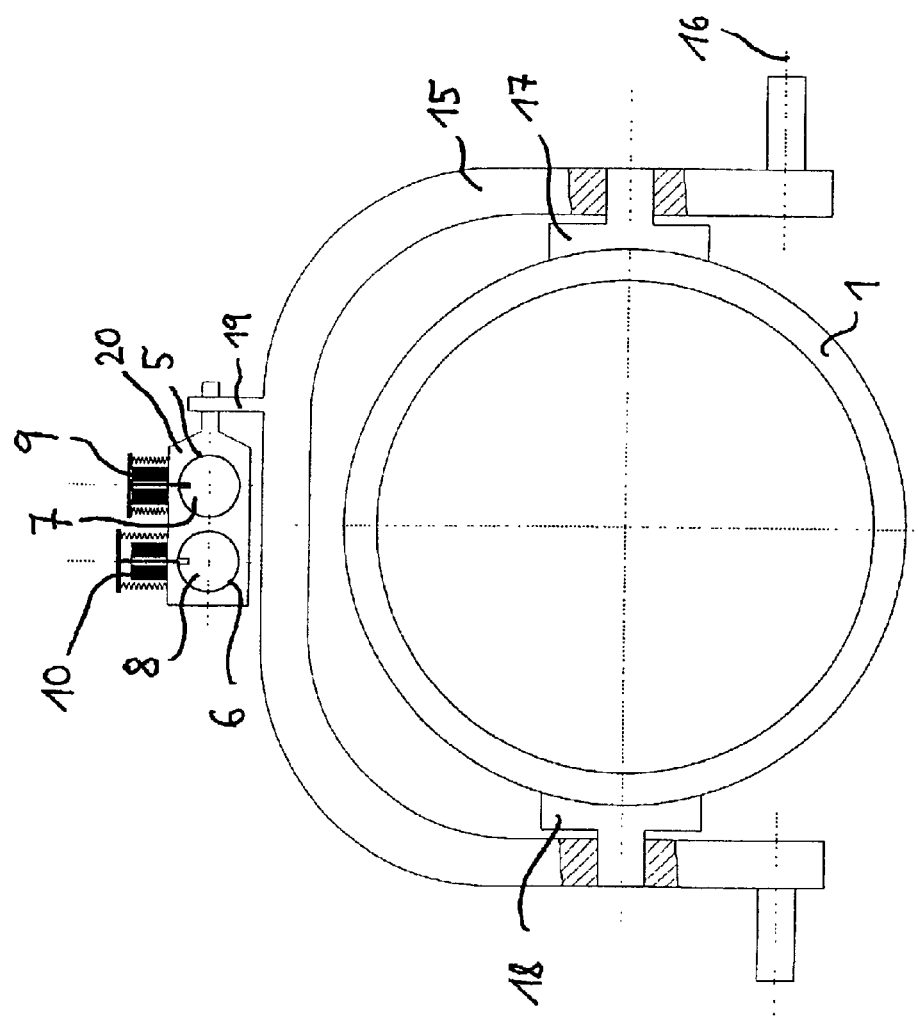
FIG. 4 depicts a variant of the invention with a gearshift rocker.

FIGS. 1 through 3 show a sliding sleeve 1, which is arranged on a stationary sleeve 2 of a transmission shaft so as not to rotate but to slide axially. The outside periphery of the sliding sleeve 1 has a circumferential groove 3, in which a gearshift fork 4 engages shape-lockingly. The gearshift fork 4 includes two passage boreholes 5, 6, through which gearshift rods 7, 8 extend. Thus, the gearshift rods 7, 8 can slide relatively with respect to the gearshift fork 4.

Two electromagnetic actuators 9, 10 are provided on the top side of the gearshift fork 4. Each of the electromagnetic actuators 9, 10 includes a coupling pin 11, which is pre-stressed into a "neutral position" by compression springs, and an electromagnet for displacing the coupling pin 11 against the spring force.

Three recesses 12–14 are provided on the gearshift rods 7, 8. By actuating one of the two electromagnetic actuators 9, 10, the coupling pins 11 can be brought "into engagement" with one of the recesses 12–14. In this manner the gearshift rods 7, 8 can be coupled with the gearshift fork 4 and/or the sliding sleeve 1. Thus, the sliding sleeve 1 can be slid axially over the gearshift rods 7, 8 by actuating the actuators 9, 10.

A significant difference with respect to the prior art is that two separate "actuating devices", that is two gearshift rods 7, 8, are assigned to the gearshift fork 4. Thus, the gearshift fork 4 can be shifted both by the gearshift rod 7 and by the gearshift rod 8.

In a transmission, several shifting lanes, formed by the sliding sleeves, are usually arranged coaxially in succession. Then the two gearshift rods 7, 8 can be assigned to several coaxially arranged gearshift forks and/or gearshift rockers. Since two gearshift rods 7, 8 are provided, two coaxially arranged "gearshift bodies", that is gearshift forks and/or gearshift rockers, can be actuated simultaneously and in particularly simultaneously in opposite directions.

The two gearshift rods 7, 8 can be actuated either completely independently of one another or can be coupled mechanically, a state that will be explained in detail below in connection with FIGS. 5 to 8.

FIG. 4 depicts an embodiment, in which the sliding sleeve 1 can be slid axially by a U-shaped gearshift rocker 15. The gearshift rocker 15 is disposed in the transmission so as to pivot about an axis 16. The opposing legs of the gearshift rocker 15 have sliding blocks 17, 18, which engage with the peripheral groove 3 (see FIG. 1) and which carry with them the sliding sleeve in the axial direction when the gearshift rocker 15 is pivoted. The cross bow of the gearshift rocker 15 has a driving finger 19, which can be slid axially by a gearshift rod guide 20, a feature that results in the pivoting of the gearshift rocker 15. The gearshift rod guide has two passage boreholes 5, 6, through which the two gearshift rods 7, 8 extend. Furthermore, according to FIGS. 1 to 3, there are electromagnetic actuators 9, 10, which enable a shape-locking coupling of the gearshift rod guide with one of the two gearshift rods 7, 8.

FIGS. 5 through 8 depict embodiments of the invention, in which the gearshift rods 7, 8 are coupled together mechanically by a coupling element.

Figure 5:
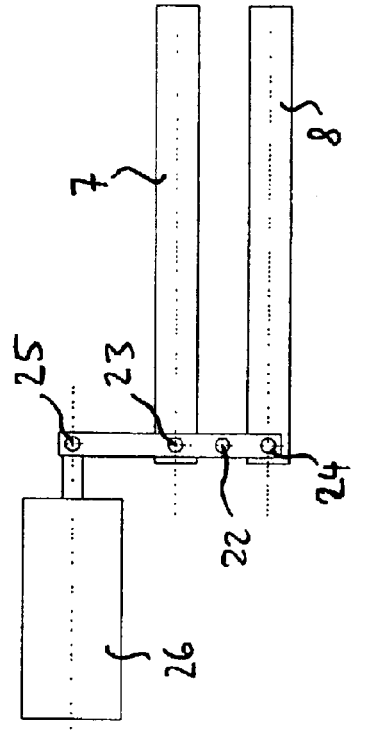
FIGS. 5–8 depict different variants of coupling elements.

In FIG. 5 the coupling element hass a T-shaped lever 21, which is pivotably mounted in the transmission on a bearing 22. The T-shaped lever 21 is coupled with the gearshift rods 7, 8 by joints 23, 24 and is coupled with a setting element 26 by a joint 25. The setting element 26 can be, for example a hydraulic and/or pneumatic cylinder or an electric motor.

By actuating the setting element 26, both gearshift rods can be slid axially. Since the bearing point 22 of the lever 21 lies between the two gearshift rods 7, 8, they are slid in different directions.

Figure 6:
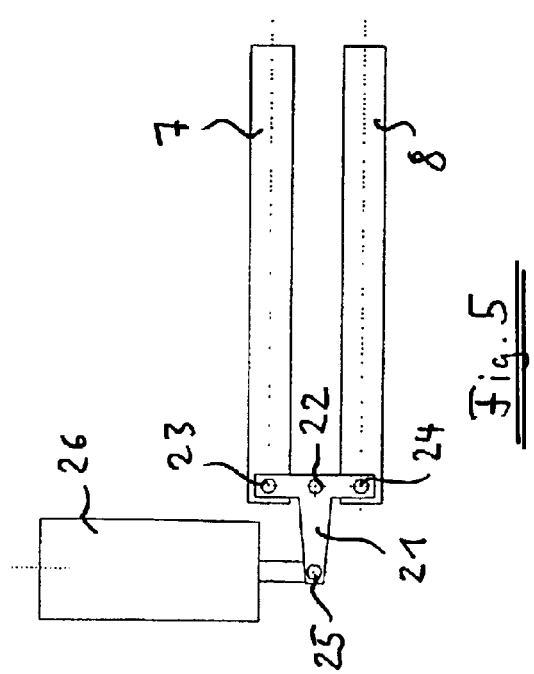

FIG. 6 depicts a variant of FIG. 5 with a rod-like lever, which is also mounted in the transmission on a bearing 21 and is coupled with the gearshift rods 7, 8 by joints 23, 24 and with the setting element 26 by a joint 25.

Figure 7:
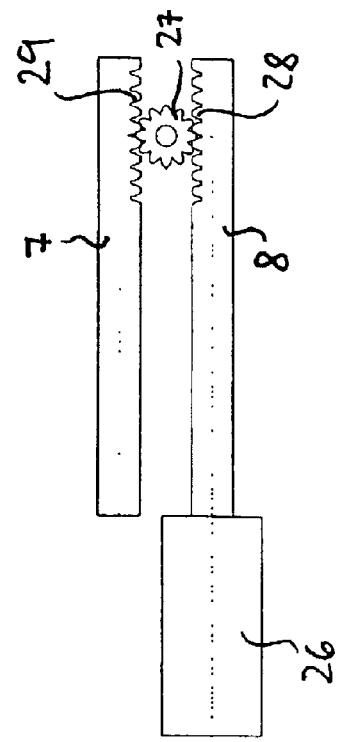

FIG. 7 depicts an embodiment, in which the setting element 26 is connected directly to the gearshift rod 8. An axial movement of the gearshift rod 8 is transformed into an opposing axial movement of the gearshift rod 7 by a rod-like lever 21.

Figure 8:
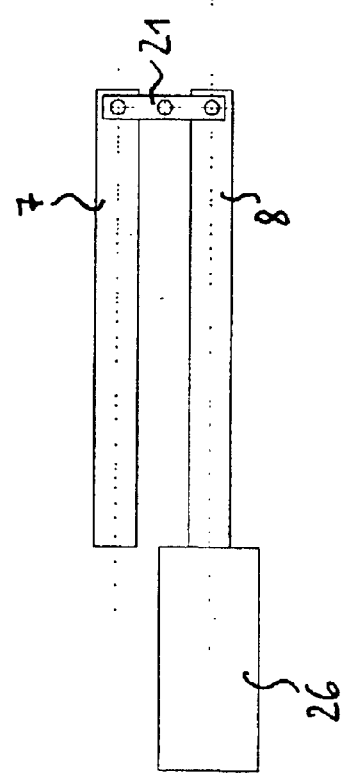

In the embodiment of FIG. 8, the "coupling element" of the two gearshift rods 7, 8 includes a gear wheel 27, which meshes with the gear rack segments 28, 29 of the gearshift rods 7, 8. An axial movement, introduced into the gearshift rod 8 by a setting element 26, is transformed into an opposing axial movement of the gearshift rod 7 by the gear wheel 27.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A manual transmission comprising a sliding sleeve, a gearshift body for axial displacement of the sliding sleeve, and two actuating devices operatively associated with the gearshift body, wherein each of the two actuating devices is independently engageable with the gearshift body to axially displace the gearshift body.

2. The manual transmission of claim 1, wherein each of the actuating devices is a gearshift rod.

3. The manual transmission of claim 1, wherein the actuating devices are engageable with the gearshift body independently of each other.

4. The manual transmission of claim 1, further comprising an actuator operatively associated with each actuating device of the gearshift body, wherein the actuator, when actuated, engages the gearshift body with the actuating device with which the actuator is operatively associated.

5. The manual transmission of claim 4, wherein each actuating device is engageable with the actuator, with which this actuating device is operatively associated, at a plurality of shift positions.

6. The manual transmission of claim 5, wherein each actuating device includes a plurality of recesses for engaging the actuator, with which the actuating device is operatively associated.

7. The manual transmission of claim 6, wherein the number of recesses is equal to the number of shift positions of the gearshift body.

8. The manual transmission of claim 4, wherein the gearshift body is a first shift body, the manual transmission further comprising a second gearshift body for axial displacement of another sliding sleeve, wherein each of the two gearshift bodies is operatively associated with the two actuating devices, and wherein each of the gearshift bodies is engageable with any one of the actuating devices.

9. The manual transmission of claim 8, wherein the actuating devices are simultaneously engageable with the first and second shift bodies, respectively, but in opposite directions.

10. The manual transmission of claim 9, further comprising a setting element, wherein both of the actuating devices are actuatable by the setting element.

11. The manual transmission of claim 10, wherein the setting element includes a hydraulic cylinder.

12. The manual transmission of claim 10, wherein the setting element includes an electric control motor.

13. The manual transmission of claim 10, further comprising a mechanical coupling element, wherein the actuating devices are connected by the mechanical coupling element.

14. The manual transmission of claims 13, wherein the coupling element includes a rocker lever, which is mounted on a bearing point and connected to the actuating devices by swivel joints.

15. The manual transmission of claim 13, wherein the coupling element includes a gear wheel and each actuating device includes a gear rack, which meshes with the gear wheel.

16. The manual transmission of claim 1, wherein the gearshift body includes a gearshift fork.

17. The manual transmission of claim 16, wherein the gearshift fork is pivotable about an axis and includes sliding blocks that are engaged with a groove of the sliding sleeve.

18. A method of making a manual transmission, the method comprising providing two actuating devices for a gearshift body of the manual transmission for displacement of the gearshift body, wherein each of the two actuating devices is independently engageable with the gearshift body to axially displace the gearshift body.

19. The method of claim 18, further comprising providing two actuators, wherein each of the actuators, when actuated, engages the gearshift body with one of the two actuating devices.

20. The method of claim 18, wherein the actuating devices are engageable with the gearshift body independently of each other.

21. The method of claim 18, further comprising providing two gearshift bodies, wherein each of the two gearshift bodies is operatively associated with the two actuating devices, and wherein each of the gearshift bodies is engageable with any one of the actuating devices.

22. The method of claim 21, wherein each actuating device is engageable with the corresponding actuator at a plurality of relative positions.

* * * * *